United States Patent

[11] 3,569,804

| [72] | Inventor | Philip A. Studer<br>Silver Spring, Md. |
|---|---|---|
| [21] | Appl. No. | 754,019 |
| [22] | Filed | Aug. 20, 1968 |
| [45] | Patented | Mar. 9, 1971 |
| [73] | Assignee | The United States of America as represented by the Administrator of the National Aeronautics and Space Administration |

[54] DIRECT CURRENT MOTOR WITH STATIONARY ARMATURE AND FIELD
8 Claims, 9 Drawing Figs.

[52] U.S. Cl. ................................................. 318/138,
310/168, 318/254, 310/254
[51] Int. Cl. .................................................... H02k 29/00
[50] Field of Search............................................ 310/263,
168, 49, 254; 318/254, 138

[56] References Cited
UNITED STATES PATENTS

| 3,304,450 | 2/1967 | Bosco et al. | 310/168X |
|---|---|---|---|
| 3,319,100 | 5/1967 | Erickson | 310/168 |
| 3,321,652 | 5/1967 | Opel | 310/168 |
| 3,467,844 | 9/1969 | Bird | 310/168 |
| 3,134,039 | 5/1964 | Bosch | 310/263X |
| 3,215,878 | 11/1965 | Woodward | 310/263X |
| 3,283,191 | 11/1966 | Carruth | 310/263X |
| 3,299,335 | 1/1967 | Wessels | 318/138 |
| 3,374,410 | 3/1968 | Cronquist | 318/138 |
| 3,418,550 | 12/1968 | Kolatorowicz et al. | 318/138 |

Primary Examiner—G. R. Simmons
Attorneys—R. F. Kempf, E. Levy and G. T. McCoy

ABSTRACT: This disclosure describes a direct current (DC) motor structure having stationary (immovable) field and armature windings. A rotor formed of a material having high magnetic permeability and having a plurality of salient poles is rotatably mounted adjacent to the field winding so that the field winding electromagnetically induces magnetic flux in the poles. The armature windings are also mounted adjacent to the rotor. In operation, the magnetic flux induced in the poles interacts with the current passing through the armature windings. The current flow in the armature windings is controlled by a solid-state commutator in a manner normally associated with brushless DC motors. By controlling the magnitude of the current supplied to the field windings, the speed of the motor is controlled. In addition, the windings can be connected in a series, shunt or compound configuration as desired.

INVENTOR
Philip A. Studer

INVENTOR.
Philip A. Studer

INVENTOR
Philip A. Studer

BY

ATTORNEYS

INVENTOR
Philip A. Studer

BY
ATTORNEYS ived the conventional motor arrangement; that is, the armature is mounted in a stationary position and the field is mounted on a rotating shaft. The field is formed of a permanent magnetic material so that it does not have to be connected to an external source of power through slip rings, for example. The armature current is switched by the semiconductor switches in accordance with the sensed position of the rotor to provide the desired current flow. If slip rings (rather than a permanent magnet) are used to provide power to the field and create field flux, the problems related to commutator action arise. This then is the reason for using a permanent magnet rotor.

While brushless DC motors using a permanent magnet field and an electrically switched armature have found widespread use, their characteristics are limited. Specifically, they exhibit a fixed speed torque relationship which cannot be varied, and a single point of peak efficiency versus load. Moreover, in some cases it is desirable to be able to use the special characteristics of a conventional DC motor such as series, shunt or compound field winding connections, and, to be able to switch from one type of connection to another type of connection. These results cannot be obtained with prior-art brushless DC motors without reintroducing slip rings or other complex elements such as rotary transformers and rectifiers located on the moving element.

DIRECT CURRENT MOTOR WITH STATIONARY ARMATURE AND FIELD

This invention was made by an employee of the United States Government and may be used by or for the government for governmental purposes without the payment of any royalties thereon or therefor.

BACKGROUND OF THE INVENTION

Ever since the discovery of the interaction between an electric current carrying conductor in a magnet field, direct current motors have been built with three essential parts—an armature, a field, and a commutator. Since the field flux is time stationary, it may be supplied by either permanent magnets or electromagnets. In conventional direct current DC motors, the field is mounted in a stationary position in the motor's housing and the armature is mounted on a rotatable shaft. Because the current flowing in the armature must vary as a function of the position of the armature with respect to the field flux, a means of varying the current flowing in the armature must be provided. Normally, this means includes the sliding contacts of a commutator. Specifically, a commutator by means of fixed brushes, sequentially supplies power to a number of armature terminals as the armature revolves. The terminals are electrically connected to a set of commutator "bars" set into a portion of the rotor's surface upon which the brushes bear. There is an appropriate angular relationship between the location of the commutator bars and the brushes so that an interaction between the current flowing in the armature and the magnetic flux generated by the field occurs. This interaction causes rotary motor action.

Due to both the mechanical and electrical stresses imposed on the sliding contacts (the brushes and the bars), the commutator is the most wear-prone element of a DC motor. Under normal operating conditions frequent maintenance, usually requiring brush replacement, is necessary. And, in certain environments, such as high altitudes and space, normal brush materials fail prematurely and often catastrophically. Hence, it is desirable and often necessary to eliminate the sliding contacts from a DC motor.

To alleviate the commutator problem, electronically commutated (brushless) DC motors have recently been developed. In these devices, the function of the commutator is split. Sensors (optical, capacitive, or electromagnetic) sense the angular position of the rotating element of the motor. Transistor or other semiconductor switches are controlled by the sensors so that they apply power to the appropriate armature terminals at appropriate points in a cycle of operation. More specifically, prior-art brushless DC motors have inverted the conventional motor arrangement; that is, the armature is mounted in a stationary position and the field is mounted on a rotating shaft. The field is formed of a permanent magnetic material so that it does not have to be connected to an external source of power through slip rings, for example. The armature current is switched by the semiconductor switches in accordance with the sensed position of the rotor to provide the desired current flow. If slip rings (rather than a permanent magnet) are used to provide power to the field and create field flux, the problems related to commutator action arise. This then is the reason for using a permanent magnet rotor.

Therefore, it is an object of this invention to provide a new and improved brushless DC motor.

It is also an object of this invention to provide series, shunt and compound DC motor characteristics in an electronically commutated DC motor.

It is a further object of this invention to provide a brushless DC motor having control flexibility.

It is yet another object of this invention to provide a reliable and efficient controllable field brushless DC motor wherein wear-prone elements are eliminated, power dissipation of the rotating assembly is eliminated, and mechanical and magnetic losses in the rotating structure are reduced.

It is still another object of this invention to provide a DC motor wherein only the salient poles of the motor rotate thereby reducing the motor's inertia and improving the motor's response time.

It is an additional object of this invention to provide a brushless DC motor having electrically controlled torque directions and having reversibility of torque.

It is still another object of this invention to provide a brushless DC motor which can produce controlled dynamic breaking torques as well as controlled accelerating torques.

SUMMARY OF THE INVENTION

In accordance with a principle of this invention, a DC motor having a stationary armature and a stationary source of field flux is provided. A rotor formed of high permeability magnetic material is rotatably mounted adjacent to the stationary source of field flux. The rotor includes a plurality of salient poles or teeth that provide a flux linkage path for field flux. The field flux interacts with the current passing through the armature. This interaction causes the rotor to move, thereby creating rotary motion.

In accordance with another principle of this invention, the armature's current is controlled by a solid-state switching system. The solid-state system includes a sensing means for sensing the location of the rotor. The sensing means is connected to a switching means that controls the application of current to the armature. In this manner, a varying armature current is provided. More specifically, the armature coils are sequentially energized tp provide an armature field that interacts with the field flux to cause rotor motion.

In accordance with still another principle of this invention, the stationary source of field flux comprises a plurality of electrically energized windings. These windings, by an appropriate control means, are connectable in either a series, a shunt, or a compound configuration.

In accordance with a further principle of this invention, the stationary armature and the stationary source of field flux are circular and are concentrically mounted about a common axis. And, the teeth of the rotor pass through an aperture between the armature and the source of field flux.

In accordance with a still further principle of this invention, the stationary armature and the stationary source of field flux are circular and are concentrically mounted about a common axis. And, the rotor teeth rotate in planes on either side of the armature and the source of field flux.

In accordance with yet another principle of this invention, the stationary armature and the stationary source of field flux are mounted adjacent to the rotor. And, the teeth of the rotor move past the armature and the source of field flux.

It will be appreciated from the foregoing description that the invention provides a brushless DC motor having an electromagnetic armature and an electromagnetic source of field flux. Because the source of field flux is electromagnetic, it can be shunt, series or compound connected. In addition, because the source of field flux is stationary slip rings are not necessary. Moreover, because the flux induced into the rotor teeth by the stationary source of field flux exhibits no reluctance change as rotation takes place, there is an essentially lossless transfer.

It will also be appreciated from the foregoing description that the invention is electrically, magnetically and mechanically inexpensive and uncomplicated. In addition, because the source of field flux can be connected in various configurations the invention is flexible. Further, because the power applied to the source of field flux can be easily controlled the torque and speed of the motor are easily controlled. Hence, either slow or rapid response time can be provided. Also rapid response time is aided because only the rotor, not the rotor and the source of field flux, is rotated.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENTS

Figures 1, 2:
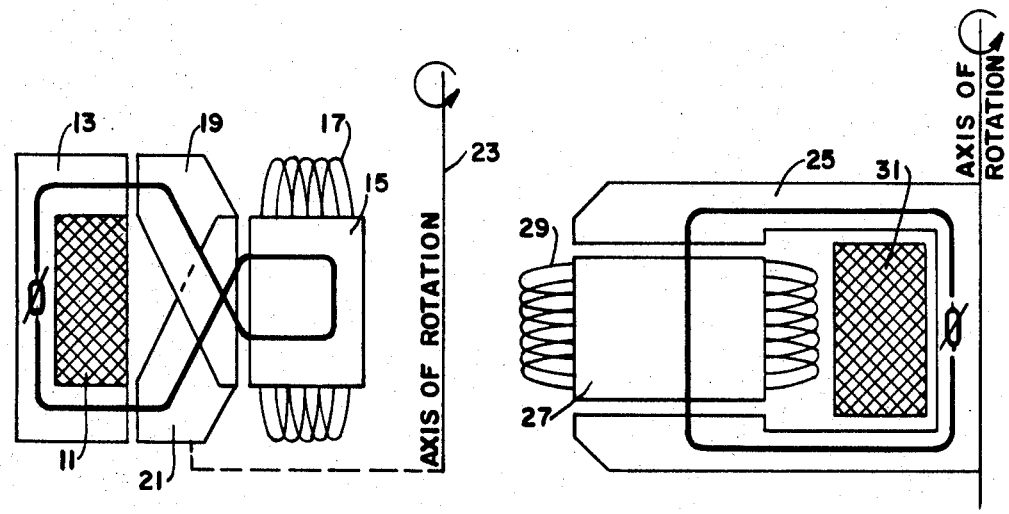
FIG. 1 is a magnetic circuit diagram illustrating one embodiment of the invention showing one-half the motor cross section with respect to the axis of rotation.
FIG. 2 is a magnetic circuit diagram illustrating a second embodiment of the invention showing one-half the motor cross section with respect to the axis of rotation.

FIGS. 1 and 2 are magnetic circuit diagrams that illustrate the basic theory of operation of the invention and are used to describe that theory of operation. The elements illustrated in FIG. 1 comprise: a stationary field coil 11 surrounded by a U-shaped field iron 13; an armature 15 surrounded by an armature winding 17; and a pair of rotor elements 19 and 21 that pass through a space between the field iron and the armature leaving a gap on either side thereof. The rotor elements are salient pole elements, formed of a magnetic material having high permeability and rotate about an axis of rotation that is illustrated on the right of the figure by a line 23. Both the field coil and the field iron are stationary as are the armature and armature windings.

In operation, the armature winding and the field coil are both energized. The field coil creates a magnetic flux path that exists along the dark line. Because this path passes through the poles of the rotor elements, a magnetic flux is induced therein. The magnetic flux induced in the rotor elements attempts to interact with the current passing through the armature windings or coils in the manner normally associated with motors. Because of this interaction the salient poles are subject to forces causing them to move. As the rotor elements move, armature currents are switched so that these forces continue to act to cause motion in the same direction resulting in continuous rotary motor action. Hence, without sliding contacts or slip rings, the invention creates a fixed field flux that interacts with armature current to create rotary motion.

FIG. 2 is a magnetic circuit diagram that illustrates an alternate configuration of the basic elements of the invention illustrated in FIG. 1. As viewed in FIG. 2, a rotor 25 that is generally U-shaped in cross section has ends or salient poles that project over an armature 27. The armature is surrounded by armature windings 29. A field coil 31 is mounted inside of the U of the rotor adjacent to the cross member of the U. The axis of rotation is along the outer edge of the cross member of the U-shaped rotor as illustrated by the vertical line on the right of FIG. 2. The path for the flux generated by the field coil is along the dark line passing through the rotor 25 and the armature 27. As with the configuration illustrated in FIG. 1, both the armature 27 and the field 31 are stationary. And, the armature current as the armature current coils are sequentially energized causes the rotor poles to move causing rotary motion about the axis of rotation.

From the foregoing description of FIGS. 1 and 2, it will be appreciated that the invention involves a novel apparatus which basically comprises a stationary field and a movable rotor. The field induces a magnetic flux in the poles of the rotor. Then, the rotor's flux interacts with the armature current to create torque about the rotor's axis of rotation. It is this torque which causes the rotor to revolve, resulting in motor action.

Figures 3, 4:
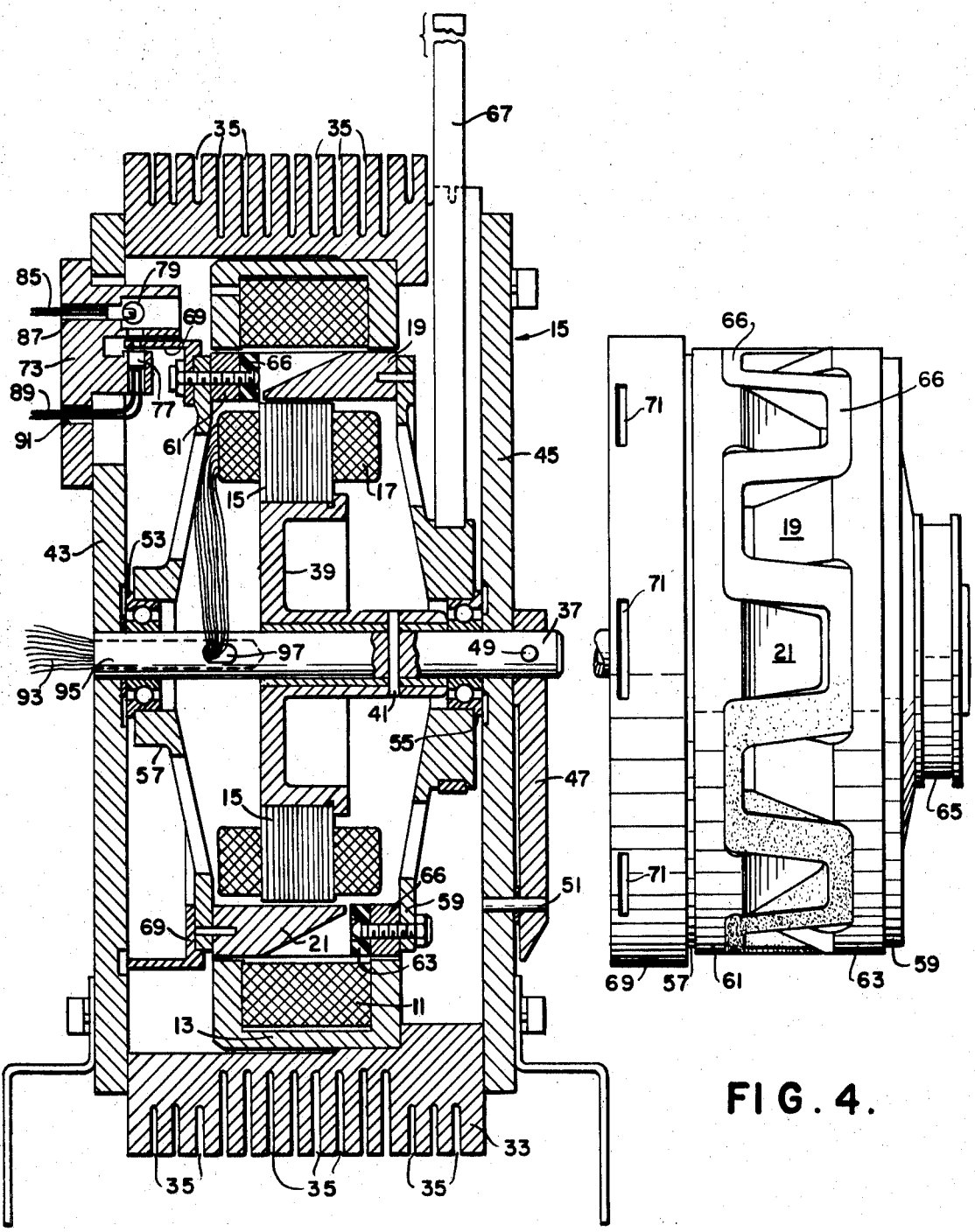
FIG. 3 is a cross-sectional view of an embodiment of the structure of a DC motor made in accordance with the magnetic circuit diagram illustrated in FIG. 1.
FIG. 4 is a pictorial view of the rotor that forms a part of the motor illustrated in FIG. 3.

FIGS. 3 and 4 illustrate one embodiment of the invention wherein the element configuration illustrated in FIG. 1 is used. The embodiment of the invention illustrated in FIGS. 3 and 4 includes the field coil 11, the field iron 13, the armature 15, and the armature windings 17. In addition, the rotor elements or salient poles 19 and 21 are illustrated. The armature windings are a plurality of windings wound about the armature in a conventional manner.

As in FIG. 1, the field iron 13 has a U-shaped cross section. In addition, the outer configuration of the field iron is circular with inwardly projecting arms. The field coil 11 is mounted between the arms and the cross member of the U. The field iron 13 is fixedly attached to the inside of an outer cylindrical housing member 33. The housing member has a plurality of slots 35 for radiating heat.

The armature 15 is fixedly attached to a nonrotatable shaft 37 by a collar 39. The collar is pinned to the shaft by a pin 41. The shaft is attached to front and back housing members 43 and 45 which are in turn attached to the cylindrical housing member 33. The shaft is made nonrotatable by being connected to an arm 47 by a pin 49. The arm is in turn connected to the rear housing member 45 by a pin 51.

Mounted on the shaft 37 adjacent the front housing member 43 is a front bearing 53. Similarly, mounted on the shaft adjacent the back housing member 45 is a back bearing 55. Mounted on the front bearing 53 is a front rotor support cone 57 and mounted on the back bearing 55 is a back rotor support cone 59.

Attached to the front rotor support cone 57 is a front rotor section 61 best illustrated in FIG. 4. Similarly, attached to the back rotor support cone 59 is a back rotor section 63. The front and back rotor sections are each ring-shaped and have rotor elements or salient poles that project out one side in a direction parallel to the center axis of the ring. Preferably, the front and back rotor sections are formed of high permeability magnetic materials. The salient poles of the front and back rotor sections project between each other in the manner illustrated in FIG. 4. That is, the poles of the front rotor section 61 project between the poles of the back rotor section 63 and vice versa. Further, as illustrated in FIG. 3, the poles project into a space between the field iron 13 and the armature 15. Mounted between the poles is a rotor spacing member 66 formed of a nonmagnetic material. As illustrated in FIG. 3, the rotor spacing member 66 is attached to the front and back rotor section 61 and 63 at points opposite the poles of the other section.

Forming a portion of the back rotor support cone 59 is a pulley portion 65—best illustrated in FIG. 4. Mounted around the pulley portion 65 is a belt 67—best illustrated in FIG. 3. It will be clear that alternate methods of utilizing the power of the motor can be provided. In this method, as the rotor rotates the pulley moves and drives its load in a conventional manner.

Also illustrated in FIG. 3 is a photocell light structure 73 that operates as a position sensing means. The photocell light structure 73 cooperates with a ring-shaped light chopping element 69 attached to the front rotor support cone 57 on the opposite side to the front rotor section 61. The ring-shaped light chopping member 69 has a plurality of apertures 71, shown in detail in FIG. 4, located about its periphery. The apertures bear a predetermined angular relation to the poles of the front and back rotor sections 61 and 63. These apertures pass between a photocell 77 and a lamp 79 mounted in the photocell light structure 73. In operation, each time an aperture passes between the lamp and the photocell, light is detected by the photocell.

The lamp 79 is connected to a source of power by wires 85 that pass through an aperture 87 in the photocell structure 73. The photocell 77 is connected to a control circuit, such as the circuit illustrated in FIG. 9 and hereinafter described, by wires 89 that pass through an aperture 91 in the photocell light structure 73.

While only one photocell light structure 73 is illustrated in FIG. 3, it is to be understood that a plurality of such structures will be located at predetermined angular positions in the front housing 43. Hence, a plurality of sensing points are provided which are utilized as hereinafter described to control the flow of current through the armature windings 17.

It will be appreciated from the foregoing that a rather uncomplicated structure for carrying out the concept of the invention illustrated in FIG. 1 is provided by the apparatus illustrated in FIGS. 3 and 4. Energy is supplied to the armature windings 17 by wires 93 that pass through an aperture 95 along the axis of the shaft 37. The wires pass through a second aperture 97 in the side of the shaft and are attached to the armature windings 17. The energy supplied to the armature winding is switched, by a circuit of the type illustrated in FIG. 9, so that a moving armature current is provided. The field coil 11 generates a magnetic flux in the poles 19 and 21 in the manner illustrated in FIG. 1 and heretofore described. The pole's magnetic flux interacts with the moving armature current so that the poles 19 and 21 tend to move. This movement creates torque and rotary motion which is coupled by the belt 67 to a load.

Figure 5:
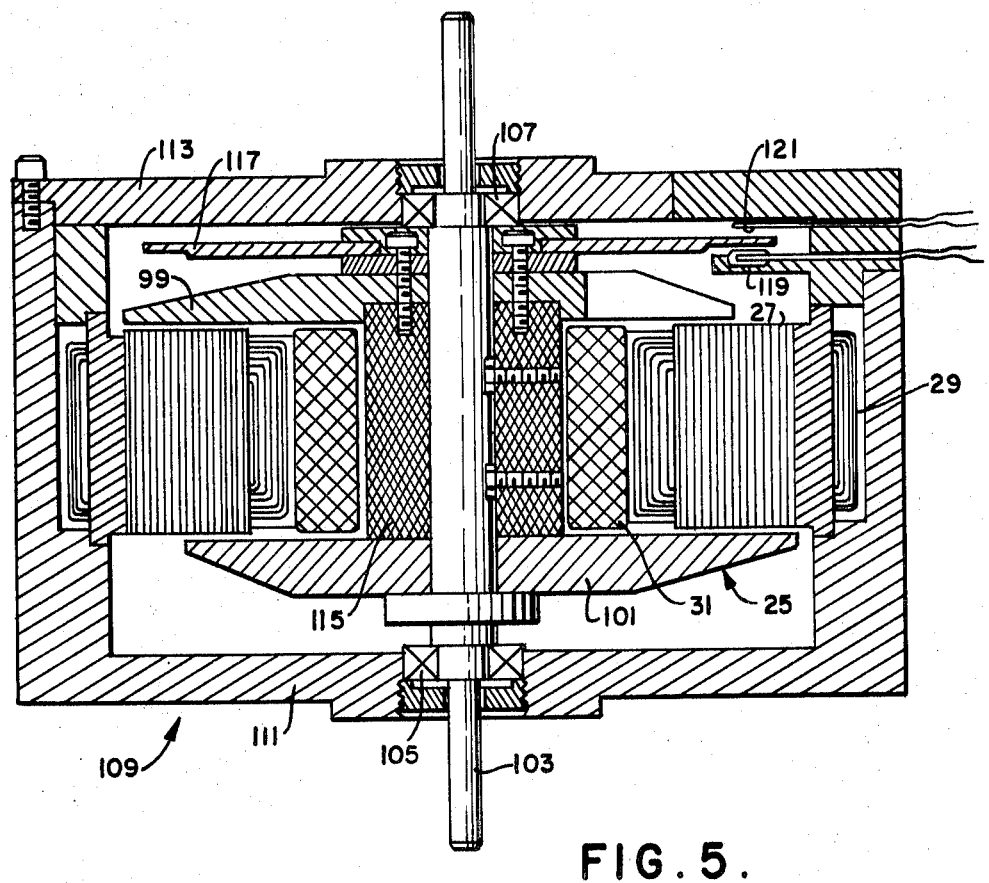
FIG. 5 is a cross-sectional view of an alternative embodiment of the structure of a DC motor made in accordance with the magnetic circuit diagram illustrated in FIG. 2.
Figure 6:
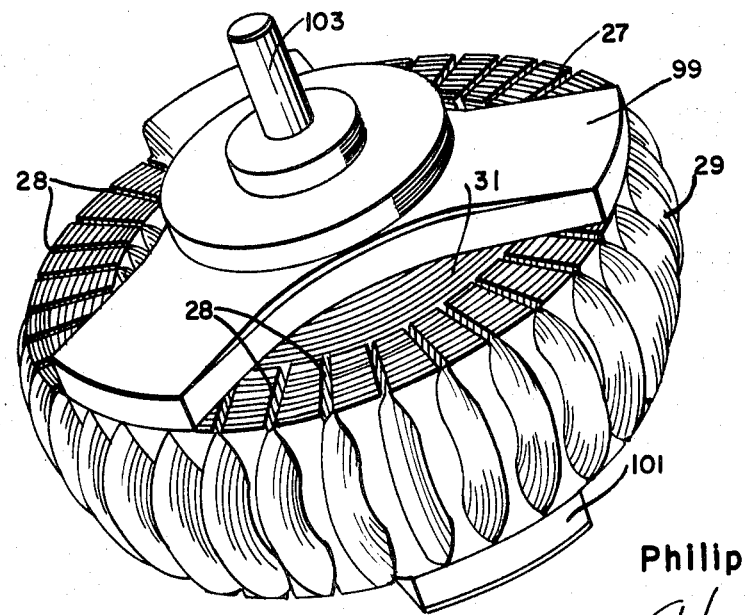
FIG. 6 is a pictorial view of the motor elements that form a part of the embodiment of the invention as illustrated in FIG. 5.

FIGS. 5 and 6 illustrate an alternate embodiment of the structure of the invention that utilizes the element arrangement illustrated in FIG. 2. The embodiment illustrated in FIGS. 5 and 6 comprises the rotor 25, the armature 27, the armature winding 29, and the field coil 31. The rotor comprises front and back elements 99 and 101 and a metallic collar 115. As seen in FIG. 6, each element is a circular piece of high permeability magnetic material having a plurality of outwardly extending salient poles. The entire structure lies in a plane with the planes of the front and back sections being parallel mounted about a shaft 103 illustrated in FIG. 5.

The shaft is rotatably mounted in front and rear bearings 105 and 107 held in a housing 109. The housing comprises a cross-sectionally U-shaped cylindrical back section 111 and a front plate 113. The front and back bearings are mounted in the front plate and the back section, respectively. Fixedly mounted inside of the U-shaped back section is the circular armature 27 having slots 28 (FIG. 6) through which the armature windings 29 are wound. Mounted inside of the armature windings is the circular field coil 31. The field coil is held in a stationary position by any suitable means. Mounted concentrically inside of the field coil 31 is the metallic collar 115 that is fixedly attached to the front and rear rotor elements 99 and 101. In addition, the collar 115 is fixedly attached to the shaft 103.

Attached to the front rotor element 99 in a stationary or fixed manner is a chopping disc 117. The chopping disc rotates as the rotor elements rotate and has a plurality of apertures that pass between a lamp 119 and a photosensor 121. The lamp, apertures and photosensor operate in a manner similar to the operation of their corresponding elements in FIGS. 3 and 4 to provide signals that are used to control the flow of current through the armature winding 29.

The motor illustrated in FIGS. 5 and 6 operates in a manner identical to the operation of the theoretical embodiment illustrated in FIG. 2. That is, the field coil 31 creates a magnetic flux in the salient poles of the front and rear rotor elements 99 and 101 and the armature current interacts with the flux to create rotary motion when the armature current is switched in a predetermined manner.

It will be appreciated that the embodiments of the invention illustrated in FIGS. 3 and 4, and 5 and 6 are brushless DC motors that have all of the advantages of prior art brush-type motors. That is, the field winding can be connected in series, shunt or compound as desired to obtain the advantages of each particular connection without the use of brushes or slip rings. Hence, the advantages of prior-art DC motors are retained without their disadvantages.

Figure 7:
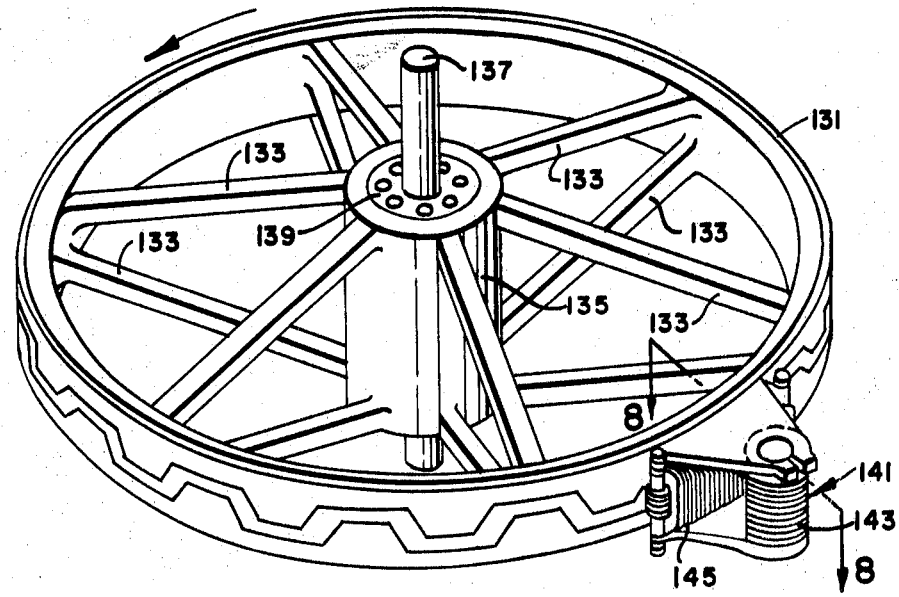
FIG. 7 is a view of a further alternative embodiment of a DC motor structure made in accordance with the invention.
Figure 8:
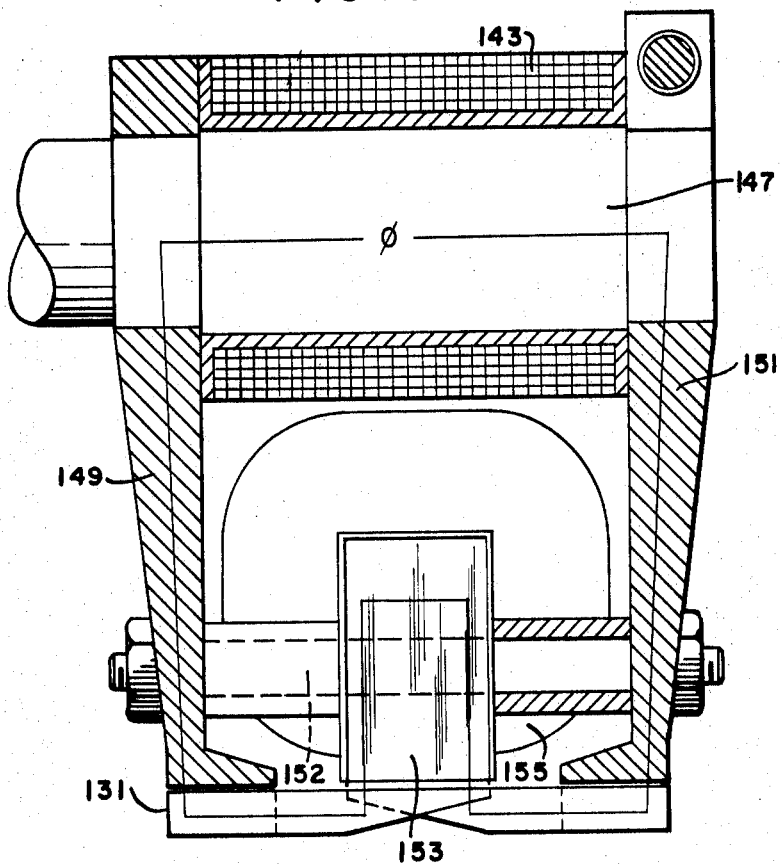
FIG. 8 is a cross-sectional view of the armature, the source of field flux and the rotor of the embodiment of the invention illustrated in FIG. 7.

FIGS. 7 and 8 illustrate an alternative embodiment of the structure of the invention wherein a large wheel is caused to rotate by the magnetic coupling effect herein described. The embodiment illustrated in FIGS. 7 and 8 comprises a large wheel 131 having an outer periphery that consists of a plurality of interlocking but separated teeth similar to the poles 19 and 21 of FIGS. 3 or 4. This ring-shaped element is connected by a plurality of bracing members 133 to an inner hub 135. A shaft 137 passes through the hub 135 and is separated therefrom by a bearing 139. The shaft 137 is held stationary; hence, the wheel 131 can revolve around it.

The poles of the wheel 131 pass a drive structure 141 that includes a field coil 143 and an armature 145. FIG. 8 illustrates a cross section the drive structure 141.

The field coil 143 is mounted about a post 147. Mounted on either side of the post and projecting toward the wheel 131 are upper and lower iron members 149 and 151. This manner of mounting allows a magnetic path to exist through the poles of the wheel 131 and the field 143. Mounted between the upper and lower iron members 149 and 151 and near the outer ends thereof is an armature support 152. Mounted by the armature support 152 is the armature 153 and wound around the armature 153 is the armature winding 155.

The embodiment of the invention illustrated in FIGS. 7 and 8 operates identically to the other embodiments of the invention. That is, the field induces magnetic flux in the salient poles that are adjacent to the field iron at any particular moment. This flux interacts with the current flow in the armature windings. The interaction between the armature current and the field flux causes the poles to move. If desired, the armature fluctuations can be externally controlled, or commutated by means of a sensor mounted adjacent to the wheel illustrated in FIG. 7. In either case a suitable control means must be provided to control the flow of current through the armature windings to cause the desired rotor or wheel action.

The embodiment of the invention illustrated in FIGS. 7 and 8 can be utilized in environments where it is desired to provide a large torque for the movement of large items. For example, the embodiment of the invention could be utilized to control the extending of solar paddles in a spacecraft. Extending of solar paddles requires low speed and high torque. And, the embodiment of the invention illustrated in FIGS. 7 and 8 is adapted to have low speed and high torque.

Figure 9:
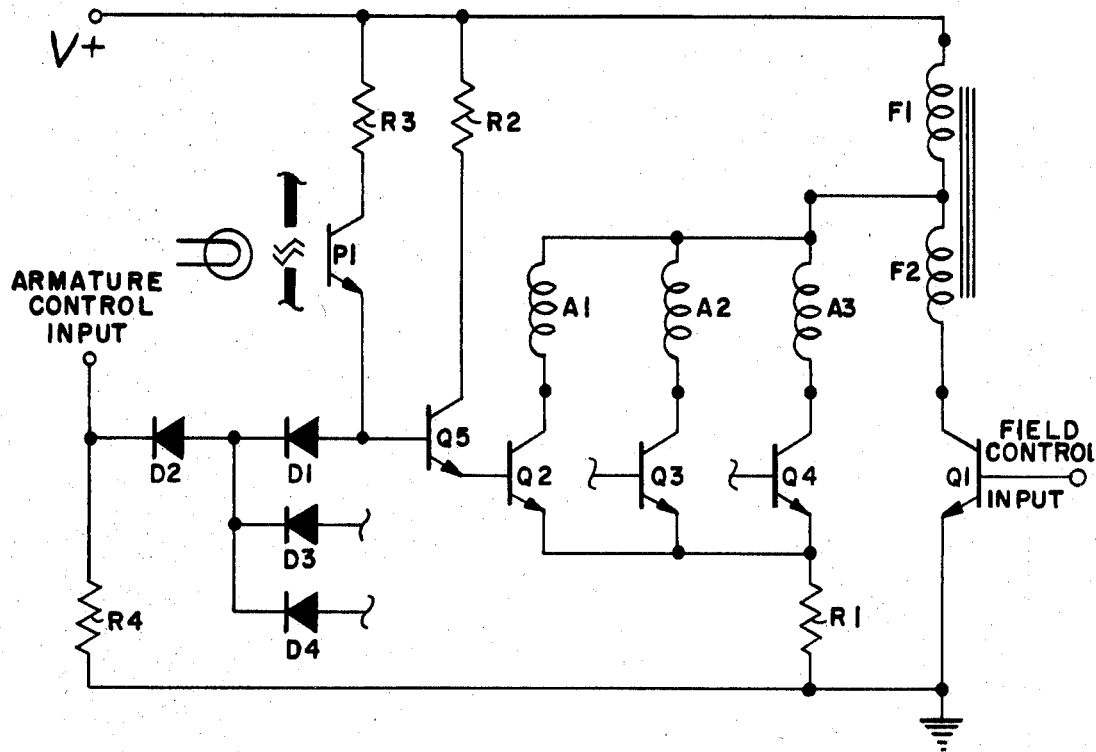
FIG. 9 is a schematic diagram of an electronic commutator suitable for controlling the armature and the source of field flux of the structural embodiments of the invention illustrated in FIGS. 3—8.

FIG. 9 is a schematic diagram of a typical control circuit suitable for controlling the passage of current in the armature and field windings of the embodiments of the inventions heretofore described. For purposes of illustration, only a single control channel is fully described. However, it will be appreciated that control channels are equal in number to the phases of the armature winding. For example, if, as illustrated in FIG. 9, a three phase armature winding is to be incorporated in the motor, three sensing elements and control channels must be provided.

The control circuit illustrated in FIG. 9 includes a split field winding comprising coils F1 and F2. One end of F1 is connected to a positive voltage source V+. The other end of F1 is connected to one end of F2 and the other end of F2 is connected to the collector of a field control transistor Q1. The base of the field control transistor Q1 is connected to a field control input terminal. The emitter of Q1 is connected to ground or a negative voltage source (V−). The junction between F1 and F2 is connected to the center of three wye connected armature windings A1, A2, and A3.

The open end of A1 is connected to the collector of a first armature switching transistor Q2. The emitter of Q2 is connected through a first resistor R1 to ground or V−. Similarly, the open end of A2 is connected to the collector of a second armature switching transistor Q3 and the emitter of Q3 is connected through R1 to ground or V−. And, the open end of A3 is connected to the collector of a third armature switching transistor Q4 and the emitter of Q4 is connected through R1 to ground or V−. Q2, Q3, and Q4 control the flow of current through their respective armature windings A1, A2, and A3.

For clarity, as stated above, only the base connection of Q2 is illustrated. The base of Q2 is connected to the emitter of a control transistor Q5; and the collector of Q5 is connected through a second resistor R2 to V+. The base of Q5 is connected to the emitter of a photodetecting transistor P1. The collector of P1 is connected through a third resistor R3 to the voltage source V+.

The base of P1 is mounted in the structures of the motors heretofor described so as to detect light from a lamp when an aperture in the chopping disc or chopping element passes between the lamp and the phototransistor. The base of Q5 is also connected through a pair of diodes D1 and D2 connected in series to an armature control input terminal. The armature control input terminal is also connected through a fourth resistor R4 to ground or V−. Other diodes D3 and D4 for other channels are connected to the junction between D1 and D2. All of the transistors are NPN transistors.

Transistors Q2, Q3, and Q4 are switching transistors and control the energization of the armature windings. As stated above, the armature windings are connected in a wye configuration. The windings are sequentially switched at 120° intervals of rotation so that a rotating armature current is provided. Transistor Q1 is a field current control transistor and controls the amount of current flowing through the field windings in response to a control potential applied to its base. In addition, by controlling the potential applied to the base of transistor Q1, field coil F2 can be, in effect, connected in shunt with the armature windings so that a compound wound motor action is provided, for example.

In operation, whenever one of the phototransistors is energized its associated switching transistor is switched on to cause current flow through one of the armature windings. Current also flows through one or both of the field windings (depending on the bias of the control transistor) to the negative supply terminal. The apertures in the light chopping member are arranged so that the armature windings are energized in sequence so that a rotating armature current is generated; for example, each armature winding is energized for approximately 120° of rotation for the three phase windings illustrated in FIG. 9. While the armature winding current rotates, its rotation has no effect on the field windings, hence the flux generated by those windings remains stationary. The stationary field induces flux in the poles of the rotor in the manner heretofore described. And the rotor pole flux coacts with the armature current to cause motor action.

It will be appreciated from the foregoing description of the circuit illustrated in FIG. 9 that except for the provision of a field winding control the circuit is similar to and operates in a manner similar to many prior art electronically commutated brushless DC motor control circuits. That is, the circuit (except for the field winding) could be utilized to control the flow of armature currents in a prior-art brushless DC motor that utilizes a permanent magnet rotor. Consequently, it will be appreciated that many prior-art brushless DC motor control circuits may be used in this invention in lieu of the circuit illustrated in FIG. 9.

It will also be appreciated that appropriate solid state or other switches can be connected to the windings illustrated in FIG. 9, and that these switches can be used to connect the field windings in shunt, series or compound with the armature windings. Hence, FIG. 9 merely illustrates one of a large number of control circuits that can be used with the inventive motor structure.

I claim:

1. An electronically commutated brushless direct current would field motor comprising: and armature mounted in a stationary position; a field winding mounted in a stationary position; a rotor having salient poles mounted for rotation on a shaft, said armature, field and shaft all mounted in a housing; said rotor mounted so that magnetic flux is induced in said poles by said field and so that said induced magnetic field interacts with current flow through said armature causing rotation of said rotor; control means directly connected to said armature and field for controlling the flow of current through said armature and the flow of current through said field; position-sensing means mounted in said housing and connected to said control means for sensing the position of said rotor and for applying a control signal to said control means and chopping means mechanically connected to said rotor for generating a position signal in said position-sensing means.

2. An electronically commutated brushless direct current motor as claimed in claim 1 wherein said shaft is fixedly attached to said housing and said rotor rotates about said shaft.

3. An electronically commutated brushless direct current motor as claimed in claim 2 wherein said rotor comprises:
   a front rotor support cone rotatably mounted on said shaft;
   a back rotor support cone rotatably mounted on said shaft;
   a front rotor section mounted on said front rotor support cone, said front rotor section being ring-shaped and having a plurality of teeth that project outwardly from one side of said ring in a direction parallel to the axis of said ring, said teeth projecting into a space between said field winding and said armature winding; and
   a back rotor section mounted on said back rotor support cone, said back rotor section being ring-shaped and having a plurality of teeth that project outwardly from one side of said ring in a direction parallel to the axis of said ring, said teeth projecting into the space between said armature winding and said field winding.

4. An electronically commutated brushless direct current motor as claimed in claim 3 including a rotor spacing member mounted between the teeth of said front rotor section and the teeth of said back rotor section.

5. An electronically commutated brushless direct current motor as claimed in claim 4 wherein:
   said chopping means comprises a ring-shaped light chopping element attached to said front rotor support cone, said light chopping element having a plurality of apertures located on its periphery; and
   said position sensing means comprises a lamp, said lamp mounted in said housing so as to project light through the apertures in said ring-shaped light chopping element when said apertures are in predetermined positions, and a photocell, said photocell mounted in said housing so as to detect light passing from said lamp through said apertures in said ring-shaped light chopping element when said apertures are in said predetermined positions.

6. An electronically commutated brushless direct current motor as claimed in claim 1 wherein said shaft rotates in said housing and said rotor is fixedly attached to said shaft.

7. An electronically commutated brushless direct current motor as claimed in claim 9 wherein said rotor comprises:
   a front rotor section, said front rotor section being ring-shaped and having a plurality of salient poles that project outwardly and pass aid field and said armature when said rotor is rotated; and
   a back rotor section, said back rotor section being ring-shaped and having a plurality of salient poles that project outwardly and pass said field and said armature when said rotor is rotated.

8. An electronically commutated brushless direct current motor as claimed in claim 7 wherein:
   said chopping means comprises a ring-shaped light chopping disc attached to one of said rotor sections, said light chopping disc having a plurality of apertures located on its periphery; and
   said position sensing means comprises a lamp, said lamp mounted in said housing so as to project light through the apertures in said ring-shaped light chopping disc when said apertures are in predetermined positions, and a photocell, said photocell mounted in said housing so as to detect light passing from said lamp through said apertures in said ring-shaped light chopping disc when said apertures are in said predetermined positions.